United States Patent Office 3,539,515
Patented Nov. 10, 1970

3,539,515
LUBRICATING OIL COMPOSITIONS CONTAINING PEROXIDE-TREATED PHENOTHIAZINE AS AN ANTIOXIDANT
Leo J. McCabe, Glassboro, N.J., assignor to Mobil Oil Corporation, a corporation of New York
No Drawing. Filed Apr. 3, 1968, Ser. No. 718,352
Int. Cl. C10m 1/32, 1/38
U.S. Cl. 252—47.5          6 Claims

ABSTRACT OF THE DISCLOSURE

A phenothiazine is heated in the presence of a hydrocarbyl or acyl peroxide to form a product which imparts antioxidant properties to lubricating oils. Also, a phenothiazine in combination with a lubricating oil is heated in the presence of a hydrocarbyl or acyl peroxide to form a product which itself is a lubricant having excellent antioxidant properties, or it may be used as an additive in other lubricating oils to inhibit oxidation thereof.

BACKGROUND OF THE INVENTION

Field of the invention

This invention relates to novel dehydrocondensation products derived from phenothiazines and, in particular, it relates to improved additives and industrial fluids obtained from peroxide-treated phenothiazines in fluids.

Description of the prior art

In U.S. Pats. Nos. 3,205,173 and 3,206,405, improved oils are produced by treating an ester fluid with a ditertiaryalkyl peroxide to produce a thicker fluid than the untreated ester. The resulting product has improved viscosity temperature characteristics. U.S. Pat. No. 3,128,246 describes a petroleum lubricating oil treated with an organic peroxide. The resulting oil possesses high temperature stability. In each of these patents, the base fluid is chemically modified. However, the additive must still be physically admixed with the base fluid. As a result, high temperature performance of such fluids is not always consistently effective over extended service periods. Moreover, the additive is often susceptible to chemical deterioration or does not always remain dissolved or uniformly dispersed therein.

Phenothiazine is known to be a particularly "dirty" additive, especially in synthetic lubricants. Attempts to provide improved phenothiazine performance are disclosed in U.S. Nos. 3,236,774, 3,038,859, 3,038,858, and 2,930,758. The compositions are only physical blends of the additives.

SUMMARY OF THE INVENTION

It has now been discovered that by heating a phenothiazine in the presence of an organic peroxide I obtain improved additives for organic base media. If the phenothiazine is heated with a mineral oil, an ester oil lubricant or a synthetic hydrocarbon fluid lubricant, in the presence of the peroxide, the reaction product is an improved additive for industrial organic compositions or is itself an improved stable fluid.

DESCRIPTION OF SPECIFIC EMBODIMENTS

The products of this invention are reaction products obtained by the heating of phenothiazine alone or with a second component in the presence of an organic peroxide at a temperature at least at which the peroxy radicals form thermally at a desired or convenient rate. Phenothiazines have the structure

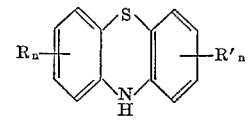

wherein R and R' may each be an organo radical, including alkyl, aralkyl, aryl, alkaryl, or oxy and halo derivatives thereof each having from 1 to about 20 carbon atoms, or halo; and $n$ is 0 to 4.

As discussed, the reaction mixture may consist of the phenothiazine alone, or phenothiazine with a mineral oil, an ester of the hindered beta-carbon type, or a hydrocarbon fluid derived from olefins.

When the phenothiazine is heated alone, the reaction product may be a polymeric dehydrocondensate of phenothiazine. An abstractable hydrogen atom, either from the ring of either nucleus or from the nitrogen atom, is believed to be taken from two or more molecules of the phenothiazine and reacted with peroxide, and a bond connecting the molecule is formed. When the phenothiazine is heated with one or more of the second fluid components, a cross-hydrocondensed product of the two components is believed to result, wherein the fluid contains chemically bonded thereto one or more phenothiazine groups.

It is theorized that as long as abstractable hydrogen atoms are present on the molecules, the dehydrocondensation polymerization may continue. The concentration of the peroxide, the reaction time and temperature, the number of abstractable hydrogen atoms and the presence of additional components are important factors in the reaction. If the reaction is conducted with these additional fluids present, the phenothiazine is usually present in a concentration of from about 0.5% to about 50% by weight, and preferably from 1% to 15%.

The products resulting from the reactions described in this invention cannot be described by structure since the course of the reaction may be complex. It is known that phenothiazine, in organic base media under operating conditions, requiring lubrication or hydraulic movement, create deposits of sludge, particularly at high temperatures. The products of this invention have improved solubility and can withstand operating conditions without excess sludge formation. The invention therefore resides in these novel reaction products and in the use of such products as fluid base media or as additives for other base media, free of any decomposition by-products also produced.

The reaction procedure simply calls for adding the phenothiazine or the phenothiazine with the mineral oil, ester, or hydrocarbon to a suitable reactor. The peroxide is slowly mixed in, preferably a minor portion first, with stirring. A nitrogen sweep may be employed, if desired. The contents of the reactor are heated to about 80° to 200° C. until the remainder of the peroxide has been added. About 1% to 25% by weight of total reactants of the peroxide may be added. Suitable means to remove water or alcohol produced during the reaction should be part of the apparatus for the sake of convenience; an extractor attached to a condenser can be employed. Further removal of remaining peroxide or alcohol can be accomplished by solvent extraction or stripping.

The peroxides which may be used in this invention include hydrocarbyl hydroperoxides, dihydrocarbyl peroxides, acyl hydroperoxides and diacyl peroxides. Such peroxides include dibutyl peroxide, diamyl peroxide, di-tertiary-butyl peroxide, di-tertiary-amyl peroxide, 2,5-dimethyl-2,5,-di(t-butylperoxy)hexane, and

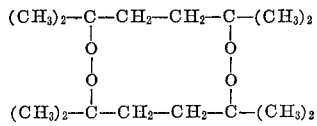

butyl hydroperoxide, amyl hydroperoxide, hexyl hydroperoxide, benzoyl hydroperoxide, dibenzoyl peroxide, tertiary-butyl perbenzoate, acetyl peroxide, and the like. Generally, alkyl, aryl and acyl peroxides having from 1 to 20 alkyl carbon atoms, or 1 to 10 carbon atoms in substituent groups of aromatic peroxides may be used. Most preferred are the tertiary-alkyl peroxides, especially di-tertiary-butyl peroxide.

Any carboxylic ester can be cross-dehydrocondensed with the phenothiazines, but the most preferred are those in which the beta carbon of the alcohol contain no hydrogen atom. These have the structure

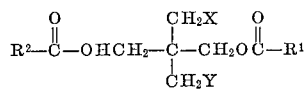

wherein $R^1$ and $R^2$ may each be alkyl, aralkyl, aryl, or alkaryl having 1 to about 19 carbon atoms, and X and Y each may be hydrogen, alkyl having 1 to about 5 carbon atoms, or

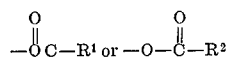

Suitable organic esters of this type include the 2,2-disubstituted-1,3-propanediol esters, trimethylolalkane esters, and pentaerythritol esters of monocarboxylic acids having from 2 to about 20 carbon atoms. Mixed acids preferably aliphatic, may be used. The diol may have at the 2,2-positions alkyl groups having up to 5 carbon atoms. These alkyl groups may be the same or different. Esters of neopentyl glycol, 2,2-diethyl-1,3-propanediol, 2,2-dipropyl-1,3-propanediol, unsymmetrical 2,2-dialkyl-1,3-propanediol esters are used. Trimethylolethane, trimethylolpropane and trimethylolbutane esters are the preferred triol esters. Most preferred are the pentaerythritol esters. These esters make excellent, clear high temperature base lubricants when combined with a minor amount of phenothiazine in a cross-dehydrocondensation reaction. The products are also sufficiently soluble in other base media, particularly in the ester fluid itself, to provide improved antioxidant performance hitherto unobtainable. Other esters which may be used include mono- and dicarboxylic acid esters in which the organic groups contain from 1 to 20 carbon atoms, such as octyl acetate, butyl stearate, dibutylphthalate, and the like.

Mineral oils which may be employed herein include the refined mineral oils of lubricating viscosity. Oils of hydrocracking procedures, obtained from high boiling fractions or still residues which are cracked in the presence of hydrogen, may also be used.

The hydrocarbon fluid is derived from olefins and consists of dimers, trimers and tetramers of olefins having from 5 to 12 carbon atoms. The trimers and tetramers of decene are preferred in this invention.

The media in which the reaction products can be used include the three reaction components already discussed, mineral oils, ester lubricants, and hydrocarbon lubricants, and also polyglycol ethers, polyphenyl ethers, polysilicones, acetals, and the like. An ester-phenothiazine product may be employed in a polydecene fluid, for example.

The following example and test evaluations are presented to illustrate the invention without limiting its scope.

EXAMPLE 1

A mixture of 980 g. of an ester of pentaerythritol and a mixture of $C_5$- and $C_9$-carboxylic acids and 20 g. phenothiazine was charged to a reaction flask. The contents were stirred and purged with nitrogen for 5 minutes. An amount of 10 g. of di-t-butyl peroxide (DTBP) was added to the flask contents and the mixture was heated to 140–145° C. DTBP was added in 20 ml. aliquots every 15 minutes until a total of 200 g. DTBP was added. A water extractor was attached to the reaction flask to collect t-butyl alcohol formed in the reaction. After the peroxide addition was completed the reaction was stirred under a blanket of nitrogen for 6 hours. The product was stripped to 175° C. at 1 mm. Hg. to remove any unreacted di-t-butyl peroxide and its decomposition products. The final product was an amber viscous liquid.

*Analysis:*
  KV 100° F., cs.—1190.
  KV 210° F., cs.—87.03.
  Acid No.—0.28.
  Peroxide No.—0.18.
  Nitrogen, percent—0.14.
  Sulfur, percent—0.37.
  Apparent mol. wt.—1270.

In the evaluation of the products of the present invention, a fluid composition containing the additive is subjected to oxidation. Oxidation of organic substances is known to cause the formation of sludge and of acids strong enough to attack metals. In this test, the sample is subjected to oxidation by passing an air stream through the sample at 425° F. for 24 hours at 5 liters per hour. Samples of copper, lead, aluminum and iron metals are present in the fluid. The lead specimen is a sheet ¼ inch x ¼ inch x ¹⁄₁₆ inch and is preweighed to determine loss.

A series of lubricant compositions are prepared for this oxidation test: the fluid of Example 1, the fluid as an additive in the ester described in Example 1, the ester alone without additive, and the ester with 2% phenothiazine. Results of the test include percent change in kinematic viscosity at 100° F., visual sludge formation, and lead loss. These results are as follows:

TABLE I

| Additive | Conc., wt. percent | Kin. visc., percent change | Visual sludge | Lead loss, mg. |
|---|---|---|---|---|
| Ester | 100 | 245 | Trace | 21 |
| Ester / Phenothiazine | 98 / 2 | 44 | Heavy | 20 |
| Product of Example 1 | 100 | 15.5 | Nil | 4 |
| Ester product of Example 1 | { 90 / ¹ 10 } | 126 | Nil | 11 |

¹ Contains equivalent of 0.2% phenothiazine.

A second series of lubricant compositions tested in the oxidation test consisted of the ester described in Example 1 containing about 5.1% by weight of a mixture of conventional additives similar to those described in U.S. Pat. No. 3,247,111 as the base medium. Tests were carried out on this composition alone and the composition, containing at various concentrations the product prepared according to Example 1, except that 19.5% peroxide was used. The following results were obtained:

TABLE II

| Additive | Conc., wt. percent | Change in Kin. visc., percent | Visual sludge | Lead loss, mg. |
|---|---|---|---|---|
| None | | 25 | Nil | 13 |
| Product of Example 1 | 5.0 | 24 | Nil | 6.0 |
|  | 10.0 | 23 | Nil | 7.0 |
|  | 20.0 | 20 | Nil | 9.0 |

The ester-phenothiazine product of Example 1 was evaluated in similar oxidation test except that the temperature was 450° F. for a duration of 72 hours. The metals present were lead, silver, copper, steel and magnesium, each having an area of 5.5 cm.² The lead was weighed before and after the test to determine loss per surface area (mg. cm.²). The results were as follows:

TABLE III

| Additive | Conc., wt. percent | Change in kin. visc., percent | Visual sludge | Lead loss, mg. |
|---|---|---|---|---|
| None | | 106 | Nil | 10 |
| Product of Example 1 | 10 | 90 | Nil | 0.1 |

These results show the startling reduction in loss of corrosion-susceptible metals, such as lead. Moreover, when phenothiazine is added physically to an oil formulation, oxidizing conditions lead to the formation of sludge; no sludge forms when the cross-dehydrocondensed product is used.

This disclosure illustrates the various embodiments of my invention, and it may suggest minor variations thereof not expressly disclosed but which are embraced in the spirit of the invention, limited by the following claims.

What is claimed is:

1. A lubricant composition comprising a major proportion of a lubricating oil and a minor amount sufficient to impart antioxidant properties thereto of a product produced by the method comprising heating a phenothiazine in the presence of an added organic peroxide selected from the group consisting of hydrocarbyl hydroperoxides, dihydrocarbylperoxides, acylhydroperoxides, and diacylperoxides, where the said organic peroxide has from 1 to 20 carbon atoms.

2. The composition of claim 1 wherein the lubricating oil is a synthetic ester lubricant.

3. The lubricant composition of claim 1 wherein in the heating step to produce said product there is also present a second component selected from the group consisting of a mineral oil, a hydrocarbyl fluid and an organic ester having the structure

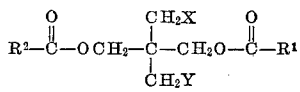

wherein $R^1$ and $R^2$ are individually selected from the group consisting of alkyl, aralkyl, aryl and alkaryl having from 1 to about 19 carbon atoms, and X and Y are individually selected from the group consisting of hydrogen, alkyl having from 1 to 5 carbon atoms,

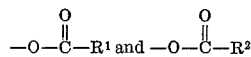

wherein $R^1$ and $R^2$ are as already defined herein.

4. The composition of claim 3 wherein the base medium is a pentaerythritol ester.

5. The composition of claim 4 wherein the base medium is an ester of pentaerythritol and an aliphatic acid having from 4 to 12 carbon atoms.

6. The composition of claim 5 wherein the aliphatic acid is a mixture of acids.

References Cited

UNITED STATES PATENTS

| 3,376,224 | 4/1968 | Elliott et al. | 252—47.5 |
| 3,344,068 | 9/1967 | Waight | 252—47.5 |

OTHER REFERENCES

Cole et al., "Antioxidant Mechanism Studies of the Phenothiazine Type," preprint, Div. Petroleum Chemistry, Am. Chem. Soc., vol. 1, No. 4, September 1956, pp. 102–114.

DANIEL E. WYMAN, Primary Examiner

W. H. CANNON, Assistant Examiner

U.S. Cl. X.R.

252—47, 402; 260—243

UNITED STATES PATENT OFFICE
CERTIFICATE OF CORRECTION

Patent No. 3,539,515          Dated November 10, 1970

Inventor(s) Leo J. McCabe

It is certified that error appears in the above-identified patent and that said Letters Patent are hereby corrected as shown below:

Column 2, line 28, "cross-hydrocondensed" should read -- cross-dehydrocondensed --.

Signed and sealed this 23rd day of February 1971.

(SEAL)
Attest:

EDWARD M. FLETCHER, JR.          WILLIAM E. SCHUYLER,
Attesting Officer                  Commissioner of Paten